United States Patent
Cunnington

(12) 
(10) Patent No.: US 7,080,702 B2
(45) Date of Patent: Jul. 25, 2006

(54) ROTATING DECK BUSHING WITH DUST GUARD SYSTEM

(76) Inventor: Billy D. Cunnington, 108 E. 39th St., Boise, ID (US) 83714

( * ) Notice: Subject to any disclaimer, the term of this patent is extended or adjusted under 35 U.S.C. 154(b) by 245 days.

(21) Appl. No.: 10/860,532

(22) Filed: Jun. 2, 2004

(65) Prior Publication Data
US 2005/0189102 A1    Sep. 1, 2005

Related U.S. Application Data

(60) Provisional application No. 60/548,270, filed on Feb. 27, 2004.

(51) Int. Cl.
    *E21B 33/03*    (2006.01)
(52) U.S. Cl. .......................... 175/209; 175/211
(58) Field of Classification Search ............... 175/208, 175/209, 211; 277/634–636; 384/141
    See application file for complete search history.

(56) References Cited

U.S. PATENT DOCUMENTS

| | | | |
|---|---|---|---|
| 2,730,333 A * | 1/1956 | Lenhart, Jr. et al. ........ | 175/208 |
| 3,128,614 A * | 4/1964 | Auer ........................ | 464/163 |
| 3,944,300 A | 3/1976 | Learmont et al. ........... | 308/4 R |
| 3,951,470 A | 4/1976 | McLean ..................... | 308/3.9 |
| 4,363,357 A * | 12/1982 | Hunter ...................... | 166/84.3 |
| 4,572,589 A | 2/1986 | White ....................... | 308/4 R |
| 4,943,172 A | 7/1990 | Waldrep .................... | 384/565 |
| 5,413,415 A | 5/1995 | Collinsworth .............. | 384/508 |

OTHER PUBLICATIONS

Thiessen Team—Centeroll—Repairable Rotary Deck Bushing—Two Pages.
Foremost Industries, Inc. Rotary Deck Bushings—Bulletin 19000—Four Pages.

* cited by examiner

*Primary Examiner*—William Neuder
(74) *Attorney, Agent, or Firm*—Derek H. Maughan; Dykas, Shaver & Nipper, LLP

(57) ABSTRACT

A rotary deck bushing having an outer body held in a fixed orientation within a drill deck and an inner bushing portion that is configured for rotatable positioning within the outer body portion. A floating center bushing is removable positioned within the inner bushing and can be replaced as wear occurs. A dust deflector made up of a dust canister and a live rubber face with an opening is connected to the inner bushing portion so as to rotate with the inner bushing and to seal out the bushing portion from dust and grit and thus decrease the amount of wear upon the bearings of the device.

12 Claims, 4 Drawing Sheets

ROTATING DECK BUSHING WITH DUST GUARD SYSTEM

PRIORITY

This application claims the priority date of the provisional application entitled ROTATING DECK SYSTEM filed by the same inventor on Feb. 27, 2004, and given application Ser. No. 60/548,270, the disclosure of which is incorporated herein by reference.

DESCRIPTION

Background

Field of the Invention. The present invention generally relates to top drive drilling and mining equipment, such as those utilized in mining for gold, silver, copper and concrete, and more particularly to those drilling and mining devices that utilize a deck bushing in these deck drilling operations.

A typical deck drilling operation utilizes a deck that is connected to a truck or other device. This deck has a hole in it, which is configured to allow drill steel or the pieces of pipe connected to a drill head to pass through the deck and push against a drill head to bore a hole in the ground below. Typically, a motor is connected to drive the drill, so as to rotate and force a head into a surface to be penetrated. Deck bushings are used to surround the drill steel and provide support to the drill steel at the position where the drill steel passes through the deck of the drill rig. These bushings support the steel while the boring operations are taking place. Deck bushings themselves, are well known in the prior art. However, a variety of problems also exist with their use.

One problem that exists with many types of deck bushings is that they are subject to wear and tear and must be frequently replaced. One of the greatest sources of this wear is the friction between the drill steel and the bushing. In some instances, bushings with bearings have been utilized to reduce this friction however, the dust and dirt that accompany such an endeavor can cause large quantities of grit and dust particles to enter into the bearings themselves and foul the bearings. While sealed bearings have been utilized to attempt to reduce the quantity of contamination into the bearings, the fine particulate matter, which is the natural result of the grinding that accompanies a drilling process, cannot, as a practical matter, be prevented from entering into the bearings themselves. Once these contaminants have lodged themselves into the bearings, these contaminants bind up the bearings causing the bearings to wear prematurely and deteriorate more rapidly than would otherwise take place. When the bearings are destroyed, the friction within the device is greatly increased, and the wear upon the drill steel and the bearings increases. This increase in friction can then cause wear upon the drill steel and the motor, which can then impede the rate and ability not only of the drill bit to penetrate a surface, but can also cause premature failure of the motor and the drill steel. The breaking of these items, in addition to causing great expense, can be dangerous to all persons who are working on such a rig when such a failure takes place.

In the prior art, the answer to this problem has been to replace sealed bushings at regular constant intervals. This procedure of constantly replacing the entire bushing is expensive. In addition to the cost of the bushings themselves, the time and expense involved in replacing the bushings, and the losses due to down time of equipment, further exacerbate the costs and expenses associated with the replacement of the bushings. Another problem that exists in the prior art is that while some efforts have been made to reduce the infiltration of wear causing materials such as dirt and dust into the bushings, a significant amount of this damaging material continues to enter into the bushings and cause wear. Therefore, the replacement of the bushing because of this damage will continue to be an on going requirement.

Therefore, what is needed is a deck bushing that outlasts those deck bushings that exist in the prior art. What is also needed is a deck bushing that provides for a more readily available replacement of worn parts that can be performed more cheaply and easily than replacing the entire bushing itself. What is also needed is a device that can be attached to deck bushings that prevents the entry of dust and particulate matter into the deck bushings. Such a device will prevent the spray of dust and particulate matter into those moving parts. What is also needed is a device that performs all of the features and that can be efficiently manufactured and installed by parties in the field.

Accordingly, it is an object of the present invention to provide a deck bushing that outlasts those deck bushings that exist in the prior art. It is another object of the present invention to provide a deck bushing that provides a more readily available replacement of worn parts in a system that allows for this replacement to be performed more cheaply and easily than replacing the entire bushing itself. Another object of the present invention is to provide a device attached to a deck bushing that reduces the entry of dust and particulate matter into the deck bushing. Another object of the present invention is to provide a device that accomplishes all of the aforementioned features, and can be simply and efficiently manufactured and later installed by parties in the field. Another object of the invention is to provide a deck bushing that reduces dust and debris upon a drill rig deck thus offering a cleaner and safer work environment, which provides additional stabilization at the deck level, increases the life of the drill steel and the deck bushings, reduces the quantity of vibration, and reduces operation down time.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The purpose of the foregoing Abstract is to enable the United States Patent and Trademark Office and the public generally, especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

The present invention overcomes these problems associated with the various prior art deck bushings and provides a deck bushing with various features that reduce or eliminate these problems. The present invention provides a deck bushing that enables a user to reduce the wear to expensive parts and prevent the accumulation of dust within the deck bushing. The present invention also allows this to be done in a way that is significantly less costly and easier and more effective as compared to other methods and devices that exist in the prior art.

The present invention is a deck bushing that fits inside the deck of a drill rig at the location where the drill steel passes through the deck. The rotary deck bushing of the present invention is made up of an outer body that is held in a fixed orientation within the drill deck, and an inner bushing portion that is configured for rotatable positioning within the outer body portion. The rotatable interconnection between the inner and the outer portions is accomplished by the placement of bearings in a sealed relationship between the inner bushing and the outer body. These bearings allow the inner bushing to rotate freely within the outer body, which is held fixed in a desired location. The inner bushing further defines an aperture that is configured to receive a floating center bushing that can be selectively inserted and removed from its position within the inner bushing. This floating drop in center is intended and configured to wear more rapidly than the other portions of the bushing. The floating drop in center rotates with the drill steel and reduces the wear upon the inner bushing itself. Any wear that would ordinarily be passed onto the inner bushing is absorbed by the floating center.

When the floating center has been worn, the floating center can then be easily removed and replaced by an operator of the device without extensive cost or labor. Since the cost of this drop in floating center is typically much less than the cost of the inner bushing itself, the cost incurred is significantly less than those devices taught in the prior art. By allowing the floating drop in center to be easily replaced, an operator may compensate for wear in a manner that is cheaper, easier and quicker than replacing the entire bushing as is found in the prior art. In addition to the cost savings in terms of replacement costs, repair costs and down time, such a configuration allows the drill rig itself to function in a more stabile and efficient way. Replacing the floating center is much more cost efficient and effective than replacing entire deck bushing as is done in the prior art.

In addition, a dust deflector canister is connected to the bottom portion of the inner bushing sleeve. This dust deflector canister is defined at one end by a dust deflector that is made from a very stretchable elastic material such as live rubber. This dust deflector has an aperture configured to allow passage of a piece of drill steel through, and to close tightly and seamlessly around the piece of drill steel to prevent the passage of dust into the bushings and bearings. This rubber piece is connected to the inner portion of the bushing sleeve, and the inner portion of the bushing sleeve is configured to rotate with the drill steel therefore a better seal is formed between the rubber and the drill steel than what exists in prior art devices. This seamless connection that surrounds the drill steel drastically reduces the amount of dust and debris that will pass into the bushing. This dust deflector is also sufficiently stretchable so as to allow the bit on the end of the drill steel to be pulled through the dust deflector and to be held and maintained within a space defined by the dust canister. The shape and configuration of the flexible live rubber allows dust and debris to be sealed out of the metal bushing portions of the invention. In addition, the connection between the live rubber and the frame upon which the rubber is connected allows the rubber to be easily replaced when needed. In the preferred embodiment, the live rubber rotates with the drill steel thus maintaining the appropriate sealing connection between the drill steel and the rubber, which is sufficient to keep dust and debris from entering into the bushing itself.

This invention has several key features that provide it with advantages over the prior art. First, by making the bushing have four pieces; an outer body, an inner bushing, and a floating center, and a dust deflector, the repair and replacement of those items that wear most frequently can be accomplished while preserving the other portions of the device. In most circumstances, this means that the floating center portion will wear more quickly than the surrounding portions of the bushing and thus replacement of the floating center portion, instead of the entire bushing, would be easier than what is required in the prior art devices. This feature provides a significant cost savings.

Further cost savings are achieved and accomplished by the utilization of a dust deflector device to prevent dust and other wear, inducing materials, from entering into the bearings of the device. This dust deflector is made from a tear resistant and very elastic piece of material such as live rubber. The dust deflector is dimensioned to have an opening sufficient to allow a piece of drill steel and bit to pass through the deflector while also re-closing around the drill steel so as to prevent the passage of grit and dust into the portions of the device where the bearings are located. In the preferred embodiment, this dust deflector is made from a piece of live rubber. This live rubber contains incredible stretching properties which allows the dust deflector to be stretched so much so as to allow passage of the bit and the drill steel through the dust deflector while still being able to close itself around the bit and steel to prevent dust from entering into the bushing causing increased wear upon the bearings. This feature keeps the majority of the dust and grit in a location below the drill deck, and thus assists to maintain a safer work environment. The present invention allows for reduction in the amount of wear upon the drill steel, a cleaner work environment, and reduced handling of the drill pieces, thus reducing the risk of bodily injury. The present invention also provides for reduced wear upon the bushings themselves and reduces the number of times that these devices would have to be serviced, maintained, or replaced.

While the invention is shown in one preferred embodiment, it is to be distinctly understood that the various dimensions of the device may be utilized according to the needs of the user. Thus, the invention may be configured for use with drill steel having dimensions of other objects, and advantages of the present invention will become readily apparent to those skilled in this art from the following detailed description wherein I have shown and described only the preferred embodiment of the invention, simply by way of illustration of the best mode contemplated by carrying out the present invention. As will be realized, the invention is capable of modification in various obvious respects, all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
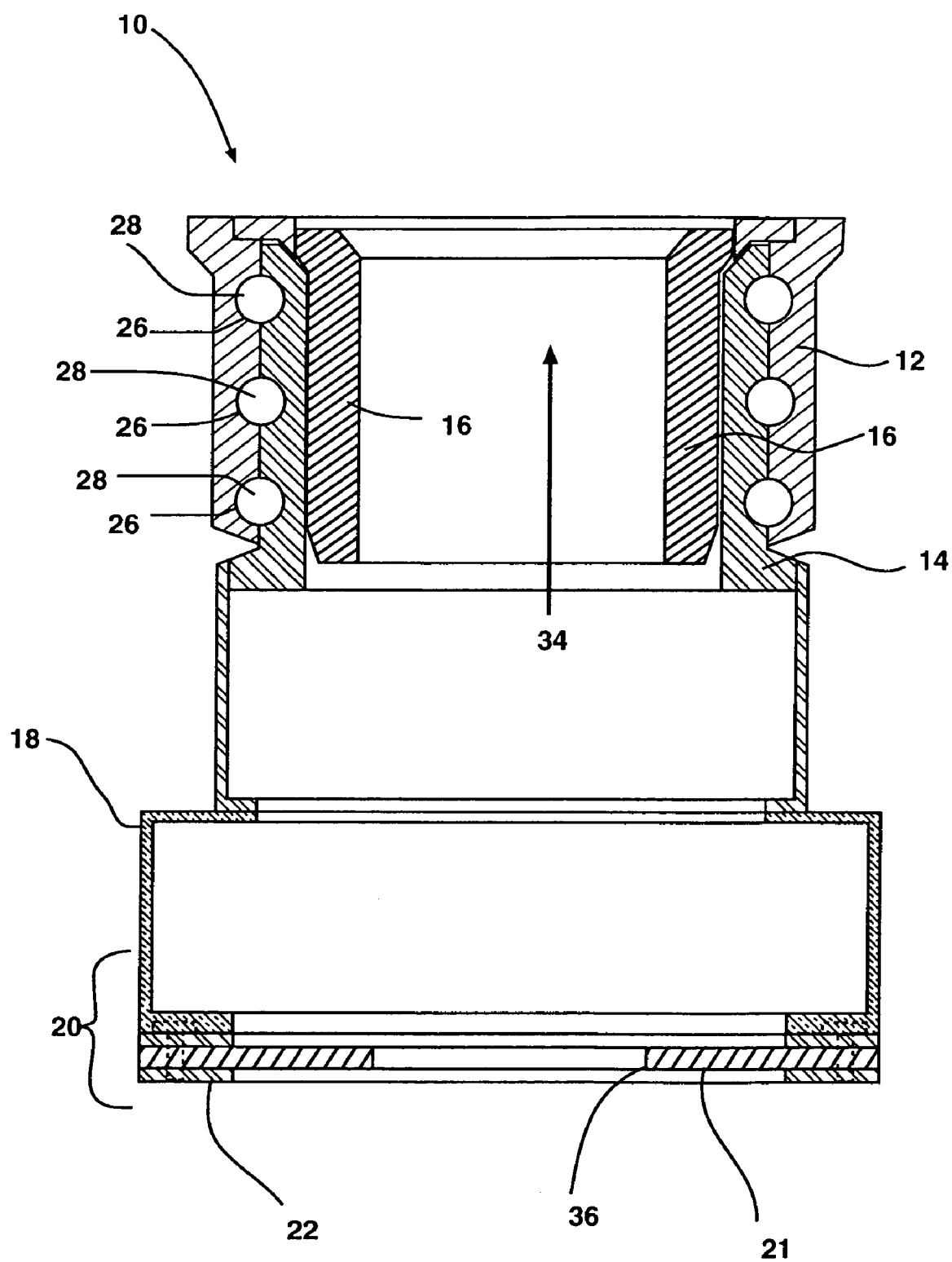
FIG. 1 is a cut away side view of a first preferred embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed but on the contrary, the invention is to cover all modifications, alternative constructions, and equivalents falling within the spirit and scope of the invention as defined in the claims.

FIGS. 1–4 show various elements of a preferred embodiment of the invention. While a preferred embodiment of the invention is shown, it is to be distinctly understood that the invention is not limited thereto, but may be variously embodied. Referring first to FIG. 1, a cross-sectional cut away view of the present invention 10 is shown. The present preferred invention 10 comprises a stationary outer roller bushing 12, a rotary extended inner deck bushing 14, a replaceable drop in floating center bushing 16, a dust deflector 20 having a dust deflector canister 18, complete frame 22, and a live rubber face piece 21.

The present invention 10 is configured to be placed and held within a drill deck upon a typical drilling rig. In such an embodiment, the drill rig has a deck through which a drill bit or boring head is attached and the boring head is configured to dig into the ground to pass through materials such as earth and rock. As the head bores into the ground, sections of pipe called drill steel are added to span the distance and gap between the motor. The bushing of the present invention 10 is configured to surround the drill steel at the location in which the drill steel passes through the deck. While in some embodiments this deck bushing is housed and held within a locked frame, which may or may not include a hydraulic locking device, the invention is not limited thereto but may be variously embodied according to the needs of the user.

A cut away view of the present invention in its preferred form is shown in FIG. 1. The present invention 10 comprises a stationary outer roller bushing 12, which in use, is connected to the deck of a drilling rig in such a way so as to anchor the entire bushing unit 10 in place and to prevent the vertical movement of the bushing 10 along a drill shaft. This outer stationary roller bushing 12 defines a plurality of compartments 26 and each of these compartments 26 are configured to hold a roller bearing 28 therein. This outer roller bushing 12 is also configured to hold an inner bushing 14 in a rotatable position and orientation within the outer roller bushing 12.

The inner bushing portion 14 is configured to fit within the outer roller bushing 12 portion, and to interact with the roller bearings 28 in such a way so as to allow the inner bushing 14 to rotate within the stationary outer bushing 12. This rotation is facilitated by the roller bearings 28, which are in place between the stationary outer portion 12 and the inner bushing portion 14 of the device. These internal stationary bearings 28 are held in place within compartments 26 between the inner 14 and the outer 12 roller bushings.

The inner bushing 14 contacts these roller bearings 28, and rotates freely within the outer roller bushing 12. The inner bushing 14 extends to a connection with a dust deflector 20. Depending upon the necessities of the user, the inner bushing 14 may be extended so as to be an integral connection with the dust deflector 20.

A floating center bushing 16 is positioned within the inner rotating bushing 14. This floating center bushing 16 is formed like a tapered donut and maintains the drill steel in a desired position. This floating bushing 16 fits within the inner rotating bushing 14 and is configured to wear and to be replaced when worn. This floating center bushing 16 provides lateral stability to the drill steel as the drill steel passes through the device 10. This floating center bushing 16 is also configured to absorb the brunt of the abuse and wear, and thus provide a replaceable portion that prevents wear upon the other portions of the rotating bushing 10. This configuration results in a significant cost savings because the configuration of the entire deck bushing 10 itself is significantly more expensive to replace.

This dust deflector 20 is configured to connect with the inner bushing 14 and to be positioned so as to allow the drill bit or drill steel to be pulled into the deflector 20. The dust deflector 20 is made up of a dust deflector canister 18. This canister 18 is open on both ends and is configured to receive a substantial portion of the drill bit or the drill steel within the canister 18. In the preferred embodiment the entire drill bit is received the canister 18. The dust deflector 20 contains a live rubber face, which is connected to the dust deflector canister 18 through a dust deflector frame 22. As is shown in more detail in FIG. 4, this live rubber face 21 contains an aperture 36 that is smaller than the diameter of the drill steel that will pass through the face 21. In the preferred embodiment, the dimensions of the aperture 36 are adapted to be about 1 to 1½ inches smaller than the diameter of the steel that is passing through the live rubber. The face 21 is made from a piece of live rubber and is configured to allow the drill bit and the drill steel to pass through and to close tightly around the drill steel. Since the live rubber face 21 is connected to the rotating inner bushing 14, the live rubber face 21 rotates with the drill steel and maintains a tight seal between the drill steel and the live rubber of the dust deflector. This prevents the entry of dust and debris into the bushings themselves. The live rubber face 21 is also configured to have sufficient stretching properties so as to allow the bit of the drill, which may be significantly larger than the opening in the rubber face 21, to pass through the rubber face. This dust deflector 20 forms a tight dust seal against the piece of drill steel and prevents the passage of dust and debris into the bushing 10. Since the dust deflector 20 is connected to the inner bushing, it also rotates with the drill steel.

Figure 2:
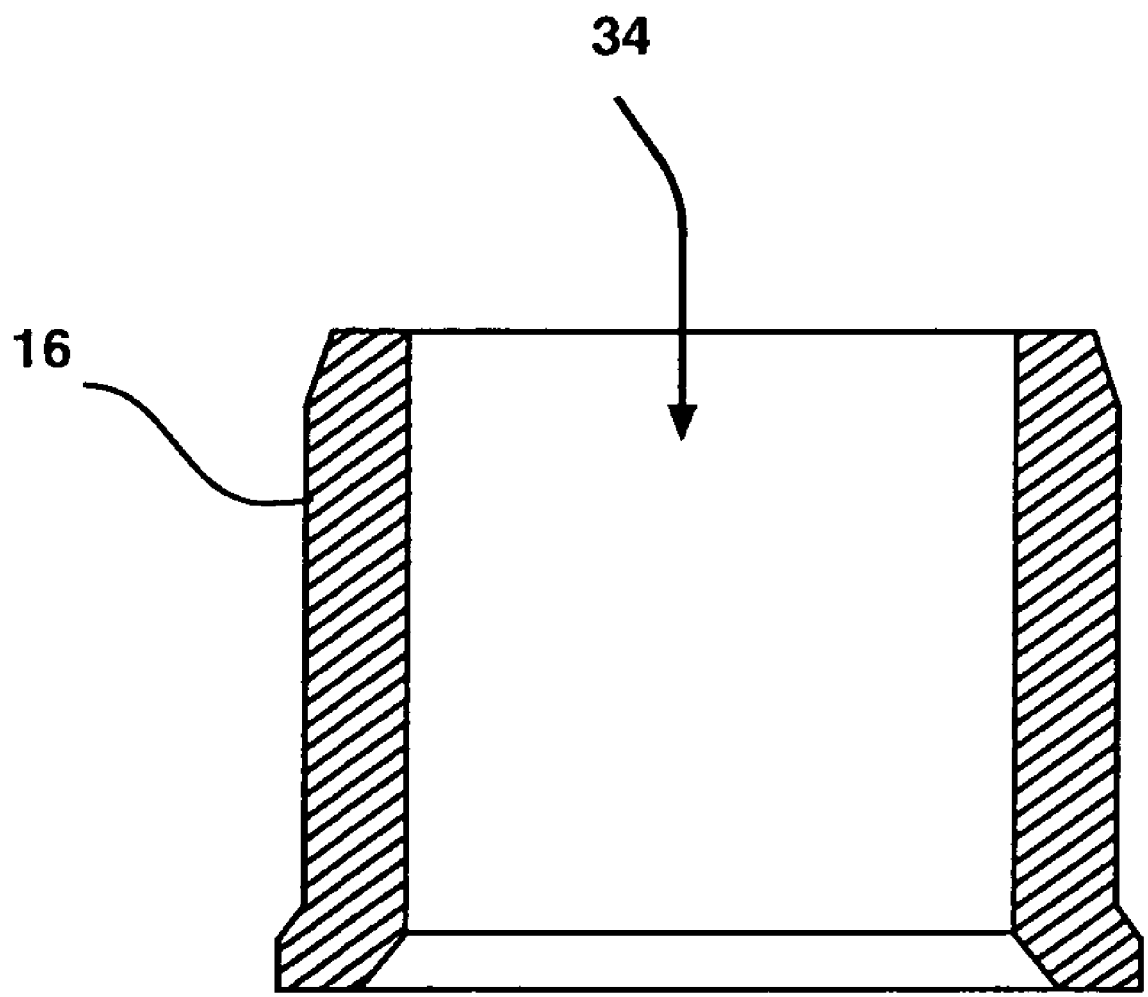
FIG. 2 is a detailed view of the floating center shown in FIG. 1.
Figure 3:
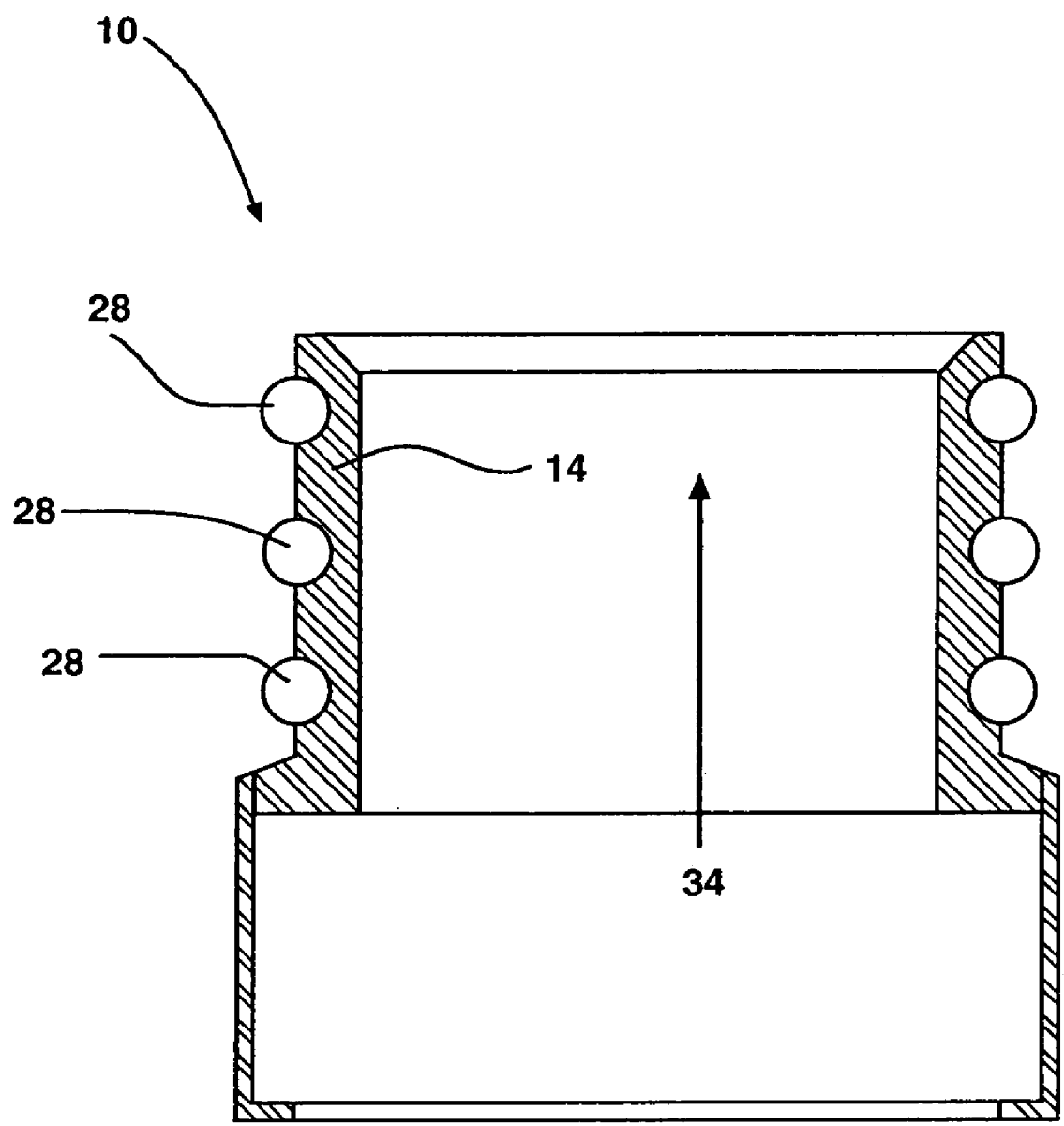
FIG. 3 is a detailed view of the inner sleeve bushing shown in FIG. 2 of the present invention.
Figure 4:
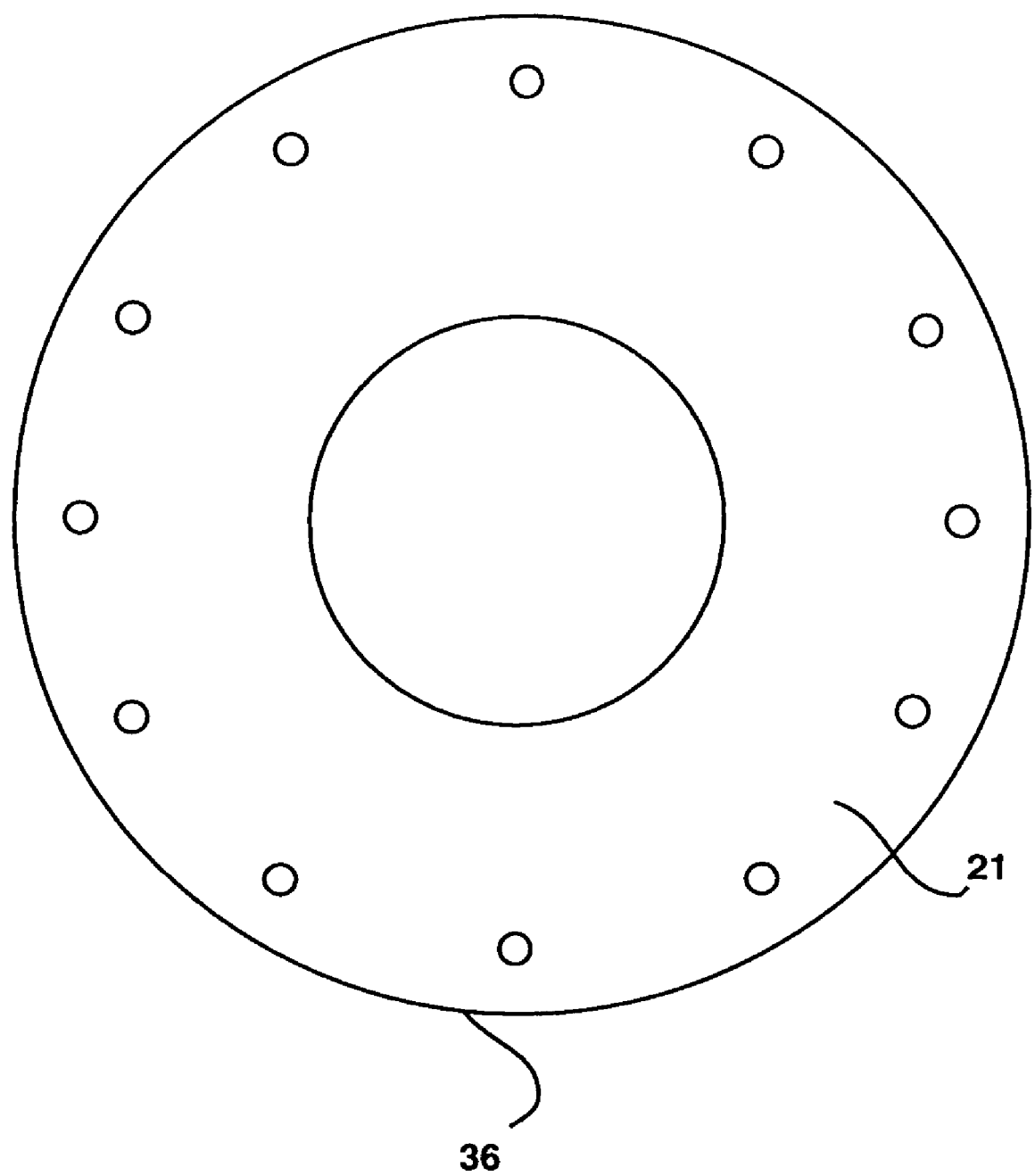
FIG. 4 is a detailed end view the live rubber face portion of the dust deflector shown in FIG. 1 of the present invention.

FIGS. 2–4 show detailed views of the floating drop in center 16 shown in FIG. 2, the rotating inner bushing 14 shown in FIG. 3, and live rubber face 21 shown in FIG. 4. While these views of the invention are shown in the present invention, it is to be distinctly understood that the invention is not limited thereto, but may be variously embodied according to the necessities of the user.

In the preferred embodiment, the outer, inner, and floating center bushings are manufactured from 4140 high-grade heat-treated steel. This steel has a high strength and resists wear well. The dust deflector portion 20 of the device is comprised of three parts. The first is a canister 18 that is bolted to the extended inner rotating bushing 14. The second is a bolted frame 22 that holds the live rubber face 21 plate in place. This configuration allows the dust deflector to rotate with the drill steel while maintaining a desired dust seal between the various portions of the device. This in turn prevents the entry of dust and debris into the bearing, and prolongs the life of the bearing assembly itself. This product reduces the amount of debris and dust going into the hole onto the deck and deck rotating bushing. The dust deflector rubber is made of a material that is hard enough to be attached to the bit and drill so as to wipe those pieces as they pass through the aperture. It also has to be flexible enough so that the larger sizes of bit can pass through a small hole in the rubber and then return to its original size so as to provide the desired sealing benefit.

The present invention provides significant advantages over the prior art in that the present invention allows deep penetration rates of drill steels to be increased by reducing the friction and drag upon the device as compared to other items in the prior art. In the prior art, the drill steel rubs against a conventional wear bearing thus requiring increased rotations per minute and high down pressure in order to advance the drill. The present invention also reduces the amount of dust and debris caused by the rotating drill and air being forced upward to the deck of the drill. This also maintains a safer and cleaner work environment on the deck because it keeps dust particles from entering the roller bushing bearings thus, prolonging the life of the bearings.

While there it is shown and described in the present preferred embodiment of the invention, it is to be distinctly understood that this invention is not limited thereto, but may be variously embodied to practice within the scope of the following claims. From the foregoing description it will be apparent that various changes may be made without departing from the spirit and scope of the invention as defined by the following claims.

I claim:

1. A deck bushing comprising:
a stationary outer roller bushing configured for rotating interaction with an inner bushing,
said inner bushing configured to be placed within said stationary outer roller bushing and to hold a floating center bushing therein;
a dust deflector canister attached to said inner bushing; and
a dust deflector, said dust deflector connected to said inner bushing by a dust deflector frame, whereby said deck bushing allows for a piece of drill steel to be selectively inserted and extracted through said deck bushing.

2. The deck bushing of claim 1 wherein said outer stationary roller bushing comprises an outer body configured to be received within a drill deck, said outer body defining a plurality of inner compartments and an aperture, each of said inner compartments configured to hold a roller bearing therein.

3. The deck bushing of claim 1 wherein said inner bushing is configured to fit within said aperture of said outer body in a position between said roller bearings and said outer body, said inner bushing defining a plurality of compatibly configured compartments, each of said compatibly configured compartments configured to hold a portion of a roller bearing therein.

4. The deck bushing of claim 3 wherein said inner bushing fits within said aperture, contacts said roller bearings, and rotates freely within said outer roller bushing, said inner bushing extending to a connection with a dust deflector canister.

5. The deck bushing of claim 1 wherein said floating center bushing is configured for placement within said inner bushing, said floating center bushing defining an aperture configured to hold a piece of drill steel therein.

6. The deck bushing of claim 1 wherein said dust deflector canister is configured to receive a portion of a drill bit or drill steel therein and to allow passage of a portion of said drill bit or drill steel to pass there through.

7. The deck bushing of claim 1 wherein said dust deflector defines a seamless expandable opening.

8. The deck bushing of claim 1 wherein said dust deflector is connected to said dust deflector canister through a frame.

9. A deck bushing comprising:
a stationary outer roller bushing, said outer stationary roller bushing comprising an outer body configured to be received within a drill deck, said outer body defining a plurality of compartments, each of said compartments configured to hold a roller bearing therein, said outer roller bushing configured for rotatable connection with an inner bushing;
said inner bushing configured to fit within said aperture of said outer body in a position between said roller bearings and said outer body, said inner bushing defining a plurality of compatibly configured compartments, each of said compatibly configured compartments configured to hold a portion of a roller bearing therein; wherein said inner bushing fits within said aperture of said outer body, contacts said roller bearings between said outer body and said inner body and rotates freely within said outer roller bushing, said inner bushing extending to a connection with a dust deflector canister;
a floating center bushing configured for placement within said inner bushing, said floating center bushing defining an aperture configured to allow passage of a piece of drill steel there through;
a dust deflector canister, said dust deflector canister connected to said inner bushing, said dust deflector canister configured to receive a portion of drill bit therein and to allow passage of said portion of drill bit and a portion of drill steel there through; and
a dust deflector defining a retractable and expandable opening said dust deflector connected to said dust deflector canister through a frame.

10. The deck bushing of claim 9 wherein said dust deflector comprises a face portion made of live rubber.

11. The deck bushing of claim 9 wherein said frame is dimensioned and configured to connect with said dust deflector canister.

12. The deck bushing of claim 9 wherein said dust deflector canister is formed integrally with said inner bushing.

* * * * *